US006434375B1

(12) United States Patent
Chulajata et al.

(10) Patent No.: US 6,434,375 B1
(45) Date of Patent: Aug. 13, 2002

(54) SMART ANTENNA WITH NO PHASE CALIBRATION FOR CDMA REVERSE LINK

(75) Inventors: Tatcha Chulajata, Germantown, MD (US); Hyuck M. Kwon, Wichita, KS (US); Kyung Y. Min, Potomac, MD (US)

(73) Assignee: NeoReach, Inc., Rockville, MD (US)

( * ) Notice: Subject to any disclaimer, the term of this patent is extended or adjusted under 35 U.S.C. 154(b) by 34 days.

(21) Appl. No.: 09/661,155

(22) Filed: Sep. 13, 2000

(51) Int. Cl.[7] ............................ H04B 1/06; H04B 1/38; H04B 7/216; H04M 1/00

(52) U.S. Cl. ...................... 455/276.1; 455/562; 455/62; 455/272; 455/273; 455/278.1; 375/144; 375/350; 370/342; 370/479

(58) Field of Search ................................ 455/101, 132, 455/133, 562, 63, 303–304, 560, 272, 273, 278.1, 276.1; 375/324, 325, 340, 141, 140, 350, 143, 144; 370/320, 335, 342, 479

(56) References Cited

U.S. PATENT DOCUMENTS

| | | | | | |
|---|---|---|---|---|---|
| 5,844,951 | A | * | 12/1998 | Proakis et al. | 455/137 |
| 5,923,700 | A | * | 7/1999 | Zhang | 375/141 |
| 6,167,039 | A | * | 12/2000 | Karlsson et al. | 370/342 |
| 6,185,300 | B1 | * | 2/2001 | Romesburg | 379/406.09 |
| 6,215,983 | B1 | * | 4/2001 | Dogan et al. | 455/63 |

OTHER PUBLICATIONS

Tanaka, S., et al., "Pilot Symbol–Assisted Decision–Directed Coherent Adaptive Array Diversity for DS–CDMA Mobile Radio Reverse Link", IEICE Trans. Fundamentals, vol. E80, No. 12, pp. 2445–2454, 1997.

Adachi, F., et al., "Wideband DS–CDMA for Next–Generation Mobile Communications Systems", IEEE communications Magazine, vol. 36, No. 9, pp. 56–69, 1998.

3rd Generation Partnership Project, Technical Specification Group Radio Access Network; "Physical channels and mapping of transport channels onto physical channels (FDD)", 3GPP Technical Specification, TS 25.211, v3.2.0, 2000.

3rd Generation Partnership Project, Technical Specification Group Radio Access Network; "Spreading and modulation (FDD)", 3GPP Technical Specification, TS25.213, v3.2.0, 2000.

3rd Generation Partnership Project; Technical Specification Group Radio Access Network; "Physical layer procedures (FDD)", 3G TS 25.214 v3.2.0, 2000.

* cited by examiner

*Primary Examiner*—Dwayne Bost
*Assistant Examiner*—Ray Persino
(74) *Attorney, Agent, or Firm*—Piper Rudnick, LLP; Steven B. Kelber; James M. Heintz

(57) ABSTRACT

The present invention describes an inexpensive as well as efficient smart antenna processor for a code division multiple access (CDMA) wireless communications system, such as a $3^{rd}$ generation (3G) CDMA2000 or W-CDMA system. Separate channel estimation is not required in the present invention, in contrast to a CDMA system with a conventional smart antenna. In addition, the phase distortions due to the different radio frequency (RF) mixers can be automatically compensated in the present invention. Thus, separate phase calibration is not necessary for a smart antenna processor according to the present invention, if the reverse link demodulation is concerned. Furthermore, bit error rate (BER) performance of a CDMA system with the adaptive algorithm in the present invention can be smaller than that of a conventional algorithm, for fading and additive white Gaussian noise (AWGN) environments.

22 Claims, 7 Drawing Sheets

SMART ANTENNA WITH NO PHASE CALIBRATION FOR CDMA REVERSE LINK

BACKGROUND OF THE INVENTION

1. Field of the Invention

The present invention relates to wireless telecommunications. More particularly, the present invention relates to a design of an inexpensive and efficient smart antenna processor for a code division multiple access wireless communications system. In general, a conventional smart antenna requires phase calibration due to different characteristics at the radio frequency (RF) mixers at a receiver front end. Phase calibration is an expensive component since it is built With analog device in general. The present invention describes a smart antenna processor, which does not require phase calibration.

2. Description of the Related Art

A smart antenna is a blind adaptive antenna array intended to use spatial diversity properties by placing multiple antenna elements in a linear array or other shape. It can enhance the desired signal reception by suppressing the interference signal with a direction of arrival angle (DOA) different from that of the desired signal. The general techniques employed in smart antennas have been developed from adaptive filter theory.

A smart antenna algorithm discussed in S. Tanaka, M. Sawahashi, and F. Adachi, "Pilot Symbol-Assisted Decision-Directed Coherent Adaptive Array Diversity for DS-CDMA Mobile Radio Reverse Link," IEICE Trans. Fundamentals, Vol. E80-A, pp. 2445–2454, December 1997, "Tanaka I"); S. Tanaka, A. Harada, M. Sawahashi, and F. Adachi, "Transmit Diversity Based on Adaptive Antenna Array for W-CDMA Forward Link," The 4th CDMA International Conference and Exhibition Proceedings, pp. 282–286, 1999, "Tanaka II"); and F. Adachi, M. Sawahashi, and H. Suda, "Wideband DS-CDMA for Next-Generation Mobile Communications Systems," IEEE Communications Magazine, Vol. 36, No. 9, pp. 56–69, September 1998, "Adachi") was tested in a field experiment for a 3rd generation (3G) wideband (W)-CDMA wireless communications system. Known pilot symbol patterns are inserted into a common control channel in a W-CDMA system, as discussed for example in 3rd Generation Partnership Project, "Physical Channels and Mapping of Transport Channels onto Physical Channels (FDD)," 3GPP Technical Specification, TS25.211, v3.2.0, March, 2000; 3rd Generation Partnership Project, "Spreading and Modulation (FDD)," 3GPP Technical Specification, TS25.213, v3.2.0, March., 2000; and 3rd Generation Partnership Project, "FDD: Physical Layer Procedures," 3Gpp Technical Specification, TS25.214, v3.2.0, March, 2000 (collectively "3GPP"). On the other hand, a pilot channel is used in a 3G CDMA2000 system, such as discussed in TIA, Interim V&V Text for cdma2000 Physical Layer (Revision 8.3), Mar. 16, 1999 "TIA"). A smart antenna processor generates a weight vector $\underline{w}(k)$ at the k-th snapshot (i.e., iteration). The smart antenna algorithms such as those proposed by Tanaka I, Tanaka II and Adachi try to let the weight vector converge to the array response vector $\underline{a}(\theta)=[1, e^{-j\pi \sin\theta}, \ldots, e^{-j(M-1)\pi \sin\theta}]$ rather than the total input phase vector including the fading phase, different mixer phase distortion and array phase difference, where $\theta$ is the DOA from the desired signal, M is the number of antenna array elements, e is the exponential operator, and $\pi$ is 3.14159. Also, the updated weight vector in Tanaka I, Tanaka II and Adachi is used in a channel estimation block to estimate and cancel the fading phase. Furthermore, the phase and amplitude of each array element in the smart antenna-parallel radio frequency (RF) base station receiver circuitry are different from those of other receiver unit, and vary as the received signal power changes, see Tanaka II. Fortunately, the measured data indicate that phase difference between RF receiver units is almost constant, and amplitude difference is almost zero even the received signal power changes. Therefore, phase calibration was suggested before the adaptation processing, in Tanaka II. Phase calibration is an expensive component.

The least mean square (LMS) adaptive algorithm, which is an art related to the present invention, has been known for its simplicity because the LMS does not require any calculations of correlation functions or matrix inversion. For example, the weight vector in Simon Haykin, "Adaptive Filter Theory," pp. 437, Summary of The NLMS Algorithm, Prentice Hall, 1996 ("Haykin") was updated for a general adaptive filter application by using the normalized least mean square (N-LMS) algorithm. And, it has been shown that the N-LMS algorithm in Haykin not only shows a faster convergence than the LMS algorithm but also overcomes the gradient noise amplification problem existing in the LMS algorithm. The N-LMS algorithm lets the output converge to the desired adaptation processing output. The N-LMS algorithm minimizes the mean square estimation error between the desired output and the adaptation processing output.

BRIEF SUMMARY OF THE INVENTION

It is an object of the present invention to provide an inexpensive and efficient smart antenna processor useful in a wireless communications system, such as a code division multiple access (CDMA) wireless communications system, e.g., a 3rd generation (3G) CDMA2000 or W-CDMA system. Separate channel estimation is not required in the present invention. In addition, the phase distortion due to the radio frequency (RF) mixer in each antenna element can be compensated automatically by the present invention. Thus, the phase calibration is not necessary for a smart antenna processor in the present invention if the reverse link demodulation is concerned. One embodiment of the present invention is obtained by modifying the normalized least mean square (MN-LMS) adaptive filter. This requires only (5M+2) complex multiplication and (4M+1) complex additions per snapshot. Finally, bit error rate (BER) performance of a CDMA system with the MN-LMS algorithm in the present invention is better than that with the conventional N-LMS algorithm.

The present invention is a modified and normalized (MN)-LMS adaptive filter, which can track the individual total input phase at each element. The individual total input phase consists of the DOA, fading phase, and the phase distortion due to the mixer. The smart antenna in the presentation can track the individual total input phase at each element. In addition, the smart antenna algorithm in the present invention can be applied for both W-CDMA and CDMA2000 systems while the smart antenna in Tanaka I, Tanaka II and Adachi was tested for only a W-CDMA system. Furthermore, the present invention presents an inexpensive smart antenna because the W-CDMA or CDMA2000 system with the MN-LMS algorithm in the present invention does not require either any phase calibration or any channel estimation for data demodulation purpose.

In accordance with one aspect of the invention, there is provided a method and system for receiving a signal for use in combination with wireless communications. A signal is received in a plurality of antennas. The received signal is processed utilizing an updated weight vector, wherein the updated weight vector compensates substantially for a phase distortion of the signal.

According to one alternative aspect of the invention, the received signal is processed according to an MN-LMS algorithm. According to a more specific alternative aspect of the invention, the received signal is processed according to $$\underline{w}_l(i+1) = \underline{w}_l(i) + \frac{\mu}{a+\|\underline{\tilde{y}}_l(i)\|^2} \times \left[M\underline{\tilde{y}}_l(i) - \underline{\tilde{y}}_l^H(i)\underline{\tilde{y}}_l(i)\underline{w}_l(i)\right]$$
$$= \underline{w}_l(i) + \frac{\mu}{a+\|\underline{\tilde{y}}_l(i)\|^2} \times \left[M\underline{\tilde{y}}_l(i) - \|\underline{\tilde{y}}_l(i)\|^2\underline{w}_l(i)\right].$$

According to another alternative aspect of the invention, the received signal is processed according to an N-LMS algorithm. According to a more specific alternative aspect of the invention, the received signal is processed according to $$\underline{w}_l(i+1) = \underline{w}_l(i) + \frac{\mu}{a+\|\underline{\tilde{y}}_l(i)\|^2} \times \left[M\underline{\tilde{y}}_l(i) - \underline{\tilde{y}}_l(i)\underline{\tilde{y}}_l^H(i)\underline{w}_l(i)\right].$$

The antennas may be a multiple antenna array, or may be multiple antennas. In accordance with further aspects of the invention, the antennas may be in a base station, or a mobile station.

According to another aspect of the invention, the method and system do not include phase calibration.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENT

Figure 1:
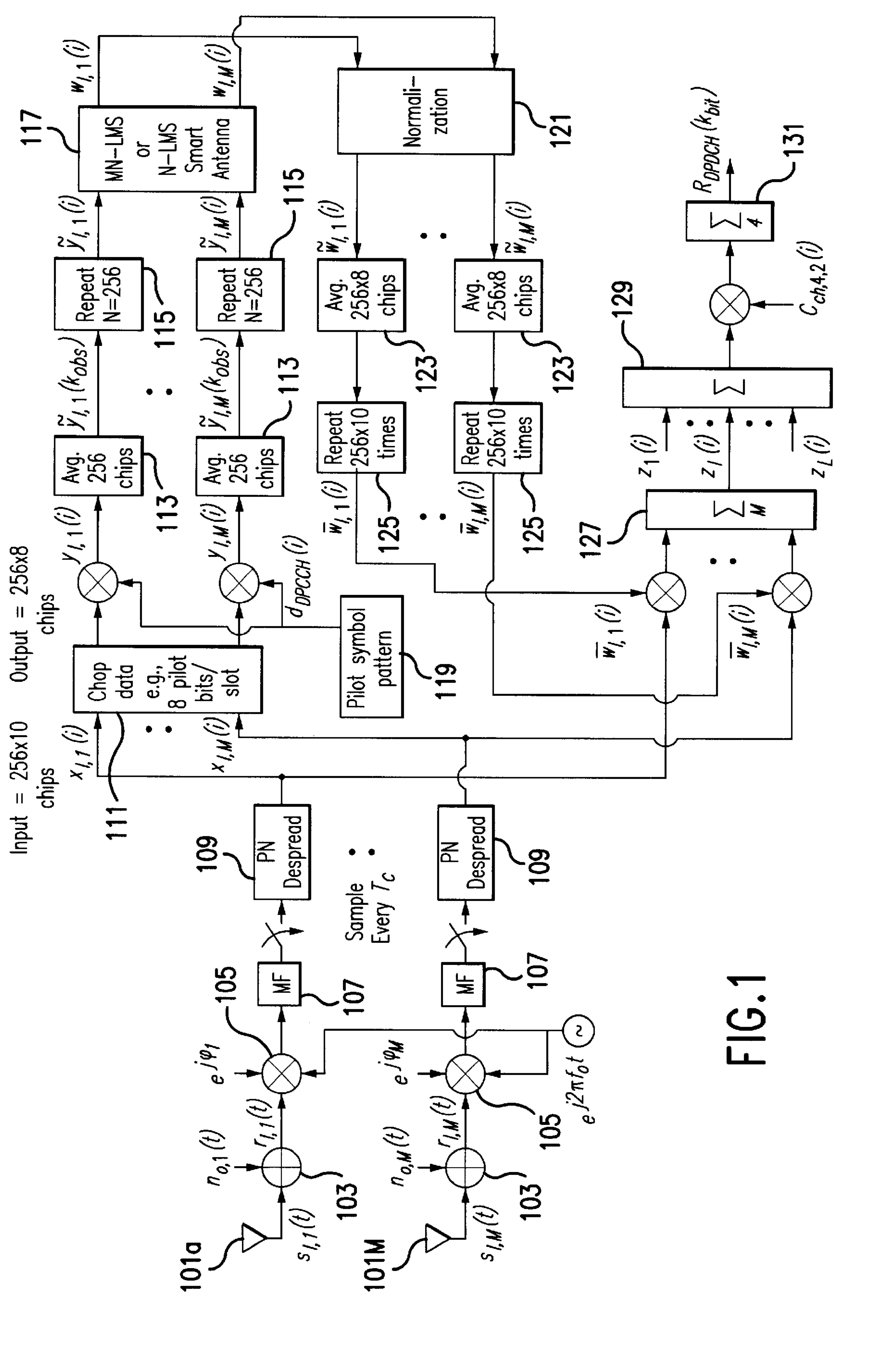
FIG. 1 shows a base station receiver block diagram with a smart antenna for a W-CDMA reverse link in accordance with one embodiment of the present invention.

The present invention can be applied to a general CDMA system as long as either a pilot channel or a pilot symbol assisted channel is used. The 3G W-CDMA system employs a pilot symbol assisted channel such as discussed in 3GPP while the CDMA2000 system a pilot channel, such as in TIA. Thus, the present invention can be applied to both W-CDMA and CDMA2000 systems. A W-CDMA system and a smart antenna with the N-LMS algorithm are reviewed. Then, a smart antenna with the MN-LMS algorithm is described later.

W-CDMA SYSTEM MODEL

Spreading is applied to conventional uplink physical channels for a W-CDMA system. It consists of two operations. The first is a channelization operation, which transforms every data symbol into a number of chips, thus increasing the bandwidth of the signal. The number of chips per data symbol is called the Spreading Factor (SF). The second operation is the scrambling operation, where a scrambling code is applied to the spread signal. One example of spreading is discussed in 3GPP on "Spreading and Modulation", p. 7.

With the channelization, data symbol, so-called I- and Q-branches are independently multiplied with an orthogonal variable spreading factor (OVSF) code. With the scrambling operation, the resultant signals on the I- and Q-branches are further multiplied by complex-valued scrambling code, where I and Q denote real and imaginary parts, respectively (see 3GPP, "Spreading and Modulation", p. 7). One dedicated physical control channel (DPCCH) and up to six parallel dedicated physical data channels (DPDCHs) can be transmitted simultaneously, i.e., $1 \leqq n \leqq 6$. The binary DPCCH and DPDCHs to be spread are represented by real-valued sequences, i.e., the binary value "0" is mapped to the real value +1, while the binary value "1" is mapped to the real value −1. The DPCCH is spread to the chip rate by the channelization code $C_{ch,0}$, while the n-th DPDCH called $DPDCH_n$ is spread to the chip rate by the channelization code $C_{ch,n}$. The channelization codes are uniquely described as $C_{Ch,SF,k}$, where SF is the spreading factor of the code and k is the code number, $0 \leqq k \leqq SF-1$. A definition of the generation method for the channelization code can be found in 3GPP on "Spreading and Modulation", p. 11. In the present invention, only one DPDCH is taken for demonstration purposes, and the DPCCH and DPDCH are spread by $C_{ch,256,0}=(1, 1, \ldots, 1)$ and $C_{ch,4,k=2}=(1,-1,1,-1)$, respectively.

The signal formats and notations for the system model are written as $$\text{a base band DPDCH signal}=C_{ch,4,k=2}(i)d_{DPDCH}(i) \tag{1}$$

$$\text{a base band DPCCH signal}=C_{ch,256,0}(i)d_{DPCCH}(i) \tag{2}$$

$$\text{long and/or short scrambling codes used by transmitter}=a^I(i)+ja^Q(i) \tag{3}$$

$$\text{a base band transmitted signal}=[C_{ch,4,k=2}(i)d_{DPDCH}(i)+jC_{ch,256,0}(i)d_{DPCCH}(i)](a^I(i)+ja^Q(i)) \tag{4}$$

$$\text{a base band received signal at a reference element in a smart antenna under fading and AWGN environment}=[C_{ch,4,k=2}(i)d_{DPDCH}(i)+jC_{ch,256,0}(i)d_{DPCCH}(i)](a^I(i)+ja^Q(i))\alpha(i)e^{j\phi(i)}+n_0(i) \tag{5}$$

$$\text{and a base band de-scrambled signal at a receiver}=[C_{ch,4,k=2}(i)d_{DPDCH}(i)+jC_{ch,256,0}(i)d_{DPCCH}(i)]\alpha(i)e^{j\phi(i)}+n(i) \tag{6}$$

where i is the chip index, $j=\sqrt{-1}$, e is the exponential operator, $d_{DPDCH}(i)=\pm 1$ valued DPDCH data at the i-th chip, $d_{DPCCH}(i)=\pm 1$ valued DPCCH pilot symbol data at the i-th chip, $a^I(i)=\pm 1$ valued real part of a complex pseudonoise (PN) spreading sequence, $a^Q(i)=\pm 1$ valued imaginary part of a complex PN spreading sequence, $\alpha(i)$ is the amplitude of a fading multipath, $\phi(i)$ is the phase of a fading multipath, $n_0(i)$ is the additive white Gaussian noise (AWGN) representing both the thermal noise and multiple access interference from other users, and $n(i)$ is the PN despread AWGN at the i-th chip.

A DPCCH frame takes 10 ms, and consists of 15 slots. Each slot takes 0.67 ms, and consists of 10 control information bits (or symbols), which are composed of pilot bits, transmit power-control (TPC) command bits, feedback information (FBI) bits, and an optional transport-format combination indicator bit (TFCI). The spreading factor for each symbol in the DPCCH is 256. Accordingly, the total number of chips in one slot is 2,560.

FIG. 1 shows a base station block diagram with smart antenna 101*a*–101M for a W-CDMA reverse link. Thermal noise 103 is added to the signals, and mixers 105 introduce different phase distortions. A matched filter 107 is performed on each signal, and sampled every chip $T_c$ and then a PN despread 109 is performed. Using the orthogonal property between different channel spreading codes, the average of equation (6) over N chip intervals (where N=256 is the number of chips per pilot symbol interval) can be approximated as $$\frac{1}{N}\sum_{i=1}^{N}[C_{ch,4,k=2}(i)d_{DPDCH}(i)+jC_{ch,256,0}(i)d_{DPCCH}(i)]\alpha(i)e^{j\phi(i)}+\eta(i)\approx jd_{DPCCH}\alpha e^{j\phi} \tag{7}$$

since the average of PN despread noise components is zero, and amplitude $\alpha(i)$ and phase $\phi(i)$ of a multipath are almost constant during a pilot symbol interval when the mobile velocity is less than 100 km/h. "Avg. 256 chips" 113 performs this average function for each element.

The de-scrambled signals in equation (6) are written in an M×1 vector for a smart antenna with M array elements as $$\underline{x}_l(i)=\begin{bmatrix}x_{l,1}(i)\\ \vdots\\ x_{l,M}(i)\end{bmatrix}=[C_{ch,4,k}(i)d_{DPDCH}(i)+jd_{DPCCH}(i)]\,\alpha_l(i)e^{j\phi_l(i)}\begin{bmatrix}e^{j\varphi_1}\\ e^{-j(\pi\sin\theta(i)-\varphi_2)}\\ \vdots\\ e^{-j((M-1)\pi\sin\theta(i)-\varphi_M)}\end{bmatrix}+\underline{n}(i) \tag{8}$$

where $C_{ch,256,0}(i)$ is I for all i and dropped in equation (8), i runs from 1 to 2560 for the first slot interval, $\phi_m$ is the phase distortion at the m-th mixer, m=1, 2, . . . , M, $\theta(i)$ is the DOA from the desired user at the i-th chip, the first element in the antenna array is used as a reference, the antenna spacing is a half wave length, and l means the multipath index called finger index, l=1, 2, . . . , L. The multipath delays are omitted without loss of generality in equation (8) since the finger outputs with the different multipath delays are aligned and combined at a Rake receiver discussed later. Equation (8) describes the output of the PN despreading. The block named by "PN Despread" 109 performs the PN despreading function.

Pilot symbol patterns are known to a base station receiver for channel estimation purpose. The smart antenna in the present invention is activated for the pilot symbol intervals. The number of pilot symbols per slot, $N_{pilot}$, can be 3, 4, 5, 6, 7, and 8 for example. For example, when $N_{pilot}$, is equal to 8, the smart antenna is applied for the first 8×256 chips every slot. The data in the last 2×256 chips are not used for the channel estimation purpose. Therefore, the data to be employed by a smart antenna would be $x_l(i)$, i=1, 2, . . . , 8×256 every slot. "Chop data" 111 performs this function.

Multiplying the known pilot symbol pattern $d_{DPCCH}(i)$ to equation (8), the signal can be written as $$\underline{y}_l(i)=\begin{bmatrix}y_{l,1}(i)\\ \vdots\\ y_{l,M}(i)\end{bmatrix}=d_{DPCCH}(i)\underline{x}_l(i)=[C_{ch,4,k}(i)d_{DPDCH}(i)d_{DPCCH}(i)+j]\alpha_l(i)\,e^{j\phi_l(i)}\begin{bmatrix}e^{j\varphi_1}\\ e^{-j(\pi\sin\theta(i)-\varphi_2)}\\ \vdots\\ e^{-j((M-1)\pi\sin\theta(i)-\varphi_M)}\end{bmatrix}+\underline{n}(i). \tag{9}$$

"Pilot symbol pattern" 119 generates the corresponding pilot symbol pattern. The signal component with data $d_{DPDCH}(i)$ in equation (9) can be completely suppressed by averaging $y_l(i)$ over N=256 chips. "Avg. 256 chips" 113 performs this averaging function as explained for equation (6). The M×1 average output vector is denoted by $\tilde{\underline{y}}_l(k_{obs})$ for finger l, and written as $$\tilde{\underline{y}}_l(k_{obs})=\begin{bmatrix}\tilde{y}_{l,1}(k_{obs})\\ \vdots\\ \tilde{y}_{l,1}(k_{obs})\end{bmatrix}=\frac{\sum_{i=(k_{obs}-1)N+1}^{k_{obs}N}\underline{y}_l(i)}{N}=j\alpha_l(k_{obs}N)e^{j\phi_l(k_{obs}N)}\begin{bmatrix}e^{j\varphi_1}\\ e^{-j(\pi\sin\theta(k_{obs}N)-\varphi_2)}\\ \vdots\\ e^{-j((M-1)\pi\sin\theta(k_{obs}N)-\varphi_M)}\end{bmatrix}+\tilde{\underline{n}}(k_{obs}) \tag{10}$$

where $k_{obs}$ denotes the observation index with observation interval $NT_c$, the OVSF modulated traffic channel data $d_{DPDCH}(i)$ is suppressed after N chip averaging, i.e., $$\sum_{i=(k_{obs}-1)N+1}^{k_{obs}N}C_{ch,4,k}(i)d_{DPDCH}(i)d_{DPCCH}(i)=0$$

due to the orthogonality, and $\tilde{\underline{n}}(k_{obs})$ is the averaged noise component. The change of DOA during an observation interval $NT_c$ would be $\theta(k_{obs}N)-\theta((k_{obs}-1)N)=vNT_c/R$ where R is the distance from the base station to a mobile and v is the mobile velocity. The DOA $\theta(i)$ in equation (9) is almost constant during an observation interval when a mobile velocity is less than 300 km/h.

The $\tilde{\underline{y}}_l(k_{obs})$ is repeated N times for the smart antenna processing if the update rate for the smart antenna weight vector is equal to the chip rate. The number of repetition decreases proportionally as the snapshot (i.e., update rate) decreases. The repeated sequence, which is the input to the smart antenna, is written as $$\tilde{\underline{y}}_l(i)=\tilde{\underline{y}}_l(k_{obs}N) \text{ for } (k_{obs}-1)N \leqq i \leqq k_{obs}N. \tag{11}$$

"Repeat N=256" 115 performs the repetition. The output of the "Repeat N=256" block 115 is input to the smart antenna processor 117. Two smart antenna processors are compared below. One is a smart antenna with a conventionally known adaptive algorithm named N-LMS (Haykin, p. 437) and the other one is with the novel adaptive algorithm described in the present invention named MN-LMS. First, N-LMS is reviewed and then MN-LMS is described later.

N-LMS ALGORITHM

Suppose that the snapshot rate is equal to the chip rate. The input to the smart antenna in FIG. 1 can be written as $$\tilde{\underline{y}}_l(i)=\begin{bmatrix}\tilde{y}_{l,1}(i)\\ \vdots \\ \tilde{y}_{l,M}(i)\end{bmatrix}=j\alpha_l(i)e^{j\phi_l(i)}\begin{bmatrix}e^{j\varphi_1}\\ e^{-j(\pi\sin\theta(i)-\varphi_2)}\\ \vdots \\ e^{-j((M-1)\pi\sin\theta(i)-\varphi_M)}\end{bmatrix}+\tilde{\underline{n}}(i) \tag{12}$$

for the i-th chip time. According to the N-LMS algorithm in Haykin, p. 437, the updated weight vector $\underline{w}_l(i+1)$ for finger 1 and snapshot i can be written as $$\underline{w}_l(i+1)=\underline{w}_l(i)+\frac{\mu}{a+\|\tilde{\underline{y}}_l(i)\|^2}\left[\tilde{\underline{y}}_l(i)e_l^*(i)\right] \tag{13}$$

where $$e_l^*(i)=M-\tilde{\underline{y}}_l^H(i)\underline{w}_l(i) \tag{14}$$

H denotes the Hermitian operation, i.e., conjugate and transpose, * denotes the conjugate operation, $\|\underline{x}\|$ is the norm of vector $\underline{x}$, a is a positive constant, $\mu$ is a constant convergence parameter, $0<\mu<2$, and $\underline{w}^H(i)\underline{w}(i)$ becomes M when the weight vector $\underline{w}(i)$ perfectly matches with the vector $[e^{j\Phi}, e^{-j(\pi \sin \theta(i)-\Phi_2)}, \ldots, e^{-j((M-1)\pi \sin \theta(i)-\Phi_M)}]^T$, which is similar to the array response vector. Therefore, M is used as a reference in equation (14) for the conventional N-LMS algorithm. The weight vector $\underline{w}_l(i)$ is the output for the conventional N-LMS algorithm at the "MN-LMS or N-LMS Smart Antenna" 117 in FIG. 1.

The weight vector in equation (13) is updated by measuring the estimation error described in equation (14), i.e., the difference between the desired reference M and the smart antenna output $\tilde{\underline{y}}_l^H(i)\underline{w}_l(i)$. When the smart antenna generates an ideal weight vector, $\tilde{\underline{y}}_l^H(i)\underline{w}_l(i)$ is equal to M with a proper normalization, and error in equation (14) will be zero.

MODIFIED N-LMS ALGORITHM

By substituting equation (14) into equation (13), the principle of the present invention can be explained. In other words, $$\underline{w}_l(i+1)=\underline{w}_l(i)+\frac{\mu}{a+\|\tilde{\underline{y}}_l(i)\|^2}\times\left[M\tilde{\underline{y}}_l(i)-\tilde{\underline{y}}_l(i)\tilde{\underline{y}}_l^H(i)\underline{w}_l(i)\right]. \tag{15}$$

The N-LMS algorithm was derived by replacing the autocorrelation matrix $R_{\tilde{y}1\tilde{y}1}(i)$ with an instantaneous estimate $\tilde{\underline{y}}_l(i)\tilde{\underline{y}}_l^H(i)$ in equation (15). For the present invention, the M×M instantaneous correlation matrix $\tilde{\underline{y}}_l(i)\tilde{\underline{y}}_l^H(i)$ in equation (15) is further replaced with a scalar $\tilde{\underline{y}}_l^H(i)\tilde{\underline{y}}_l(i)$. Then, the updated weight vector $\underline{w}_l(i+1)$ of the MN-LMS algorithm is written as $$\begin{aligned}\underline{w}_l(i+1)&=\underline{w}_l(i)+\frac{\mu}{a+\|\tilde{\underline{y}}_l(i)\|^2}\times\left[M\tilde{\underline{y}}_l(i)-\tilde{\underline{y}}_l^H(i)\tilde{\underline{y}}_l(i)\underline{w}_l(i)\right]\\&=\underline{w}_l(i)+\frac{\mu}{a+\|\tilde{\underline{y}}_l(i)\|^2}\times\left[M\tilde{\underline{y}}_l(i)-\|\tilde{\underline{y}}_l(i)\|^2\underline{w}_l(i)\right]\end{aligned} \tag{16}$$

where a is a positive constant and $\mu$ is the convergence parameter, $0<\mu<2$.

Suppose that the updated weight vector $\underline{w}_l(i)$ approaches the received vector $\tilde{\underline{y}}_l(i)$. Then $\|\tilde{\underline{y}}_l(i)\|^2$ in equation (16) is close to M under AWGN environment from equation (12) and the bracket in equation (16) becomes zero vector. The weight vector will be in steady state. This is a rationale for replacing term $\tilde{y}_l(i)\tilde{\underline{y}}_l^H(i)$ in equation (15) with a scalar $\tilde{y}_l^H(i)\tilde{\underline{y}}_l(i)$ for the present invention. In addition, solution of the weight vector satisfying equation (16) will be unique and will be the received vector $\tilde{\underline{y}}_l(i)$. Therefore, the input phase of the received signal at each antenna element can be tracked. However, the solution of the weight vector for the N-LMS algorithm in equation (15) does not need to be unique. As long as the inner product $\tilde{y}_l^H(i)\underline{w}_l(i)$ in equation (14) approaches M, error $e_l(i)$ will approach zero and many such weight vectors can minimize the mean square error in equation (14). This is why the matrix $\tilde{y}_l(i)\tilde{y}_l^H(i)$ is replaced with $\tilde{y}_l^H(i)\tilde{y}_l(i)$ in equation (16).

The inner product $\tilde{y}_l^H(i)\tilde{y}_l(i)=\|\tilde{\underline{y}}_l(i)\|^2$ is approximately equal to $M\alpha^2(i)$ under fading environment by using equation (12). It is desirable for the bracket term in equation (16) to be zero. Therefore, the weight vector would converge to $\underline{w}_l(i)=\tilde{y}_l(i)/\alpha_l^2(i)$ and $$\underline{w}_l(i)=\frac{\tilde{\underline{y}}_l(i)}{\alpha_l^2(i)}\approx\frac{j\alpha_1(i)e^{j\phi_l(i)}}{\alpha_l^2(i)}\begin{bmatrix}e^{j\varphi_1}\\ e^{-j(\pi\sin\theta(i)-\varphi_2)}\\ \vdots \\ e^{-j((M-1)\pi\sin\theta(i)-\varphi_M)}\end{bmatrix}=\frac{1}{\alpha_l(i)}je^{j\phi_l(i)}\begin{bmatrix}e^{j\varphi_1}\\ e^{-j(\pi\sin\theta(i)-\varphi_2)}\\ \vdots \\ e^{-j((M-1)\pi\sin\theta(i)-\varphi_M)}\end{bmatrix} \tag{17}$$

in an ideal case. The weight vector in equation (17) is the output of the MN-LMS smart antenna and shown at the output of "MN-LMS or N-LMS Smart Antenna" 117 in FIG. 1. The weight vector is normalized at 121 and written as $$\tilde{\underline{w}}_l(i) = \begin{bmatrix} \tilde{w}_{l,1}(i) \\ \vdots \\ \tilde{w}_{l,M}(i) \end{bmatrix} = \tag{18}$$

$$\frac{\underline{w}_l(i)}{\underline{w}_l^H(i)\underline{w}_l(i)/M} = j\alpha_l(i)e^{j\phi_l(i)} \begin{bmatrix} e^{j\varphi_1} \\ e^{-j(\pi\sin\theta(i)-\varphi_2)} \\ \vdots \\ e^{-j((M-1)\pi\sin\theta(i)-\varphi_M)} \end{bmatrix}.$$

The normalized weight vector in equation (18) is shown at the output of "Normalization" 121 in FIG. 1.

The normalized weight vector 121 is averaged every slot interval at "Avg 256×8 chips" 123, and repeated at "Repeat 256×10 times" 125 in FIG. 1. The output of "Repeat 256×10 times" 125 in FIG. 1 is written as $$\overline{\underline{w}}_l(i) = \frac{1}{(N_{pilot}=8)\times 256}\sum_{i'=1}^{(N_p=8)\times 256} \tilde{\underline{w}}_l(i') \text{ for } i = 1, \ldots, 2560. \tag{19}$$

$\tilde{\underline{y}}_l(i)$ is a new weight vector which compensates automatically for phase distortion. Note that no separate phase calibration was required, since the new weight vector automatically compensates. The demodulation output $z_l(i)$ with a smart antenna array is obtained by taking the inner-product between the averaged normalized weight vector $\tilde{y}_l(i)$ and the received signal vector $\underline{x}_l(i)$ in equation (8) at $$\sum_M$$

127 in FIG. 1. The output $z_l(i)$ is written as $$z_l(i)=\tilde{y}_l^H(i)\underline{x}_l(i)\approx M\alpha_l^2(i)[d_{DPCCH}(i)-jC_{ch,4,k}(i)d_{DPDCH}(i)] \tag{20}$$

where l=1, . . . , L and i=1, 2, . . . , 2560. The demodulation output $z_l(i)$ at each finger l,1=1, . . . , L, are combined 129 and multiplied with the OVSF code $C_{ch,4k}(i)$ for a Rake receiver, and then accumulated. The decision variable $R_{DPDCH}$ for the $k_{bit}$-th is output 131, and can be approximately written as $$R_{DPDCH}(k_{bit})\approx -jcd_{DPDCH}(k_{bit}) \tag{21}$$

where c is a positive constant and $k_{bit}$ is the traffic channel bit index. The final soft decision value can be obtained as $R_{DPDCH}(k_{bit})/(-j)$ for a soft decision decoder. The hard decision value would be the sign of $R_{DPDCH}(k_{bit})/(-j)$ and can be used for a hard decision decoder.

CDMA2000 SYSTEM MODEL

A mobile station in a CDMA2000 reverse link transmits a pilot and a traffic data channel together, which are orthogonal to each other through Walsh modulation. The pilot channel in a CDMA2000 system is always "on" while the pilot symbol inserted channel in a W-CDMA system is "on" during only pilot symbol intervals. Although a mobile station may transmit several traffic data channels simultaneously, only one traffic channel is assumed for simplicity and demonstration of the present invention. Most materials in this section are parallel to those used for W-CDMA in sections 1, 2, and 3 above. The transmitted band pass signal $s_r(t)$ in the reverse link can be written as $$s_r(t)=Re[u_r(t)e^{j2\pi f_c t}] \tag{22}$$

where $u_r(t)$ is a base band complex envelope. The base band complex signal $u_r(t)$ can be written as $$u_r(t)=[A(t)+jB(t)][a^I(t)+ja^Q(t)] \tag{23}$$

where

- A(t) represents the pilot channel signal which is a constant,
- $B(t)=d_{trafic}(t)\, W_2^4(t)$ is a Walsh modulated traffic channel,
- $d_{trafic}(t)$ is a traffic data channel of ±1,
- $W_2^4(t)$ is a Walsh symbol of (+1−1+1−1) four chips and,
- $a^I(t)$ and $a^Q(t)$ are I and Q short PN sequences, respectively.

Figure 2:
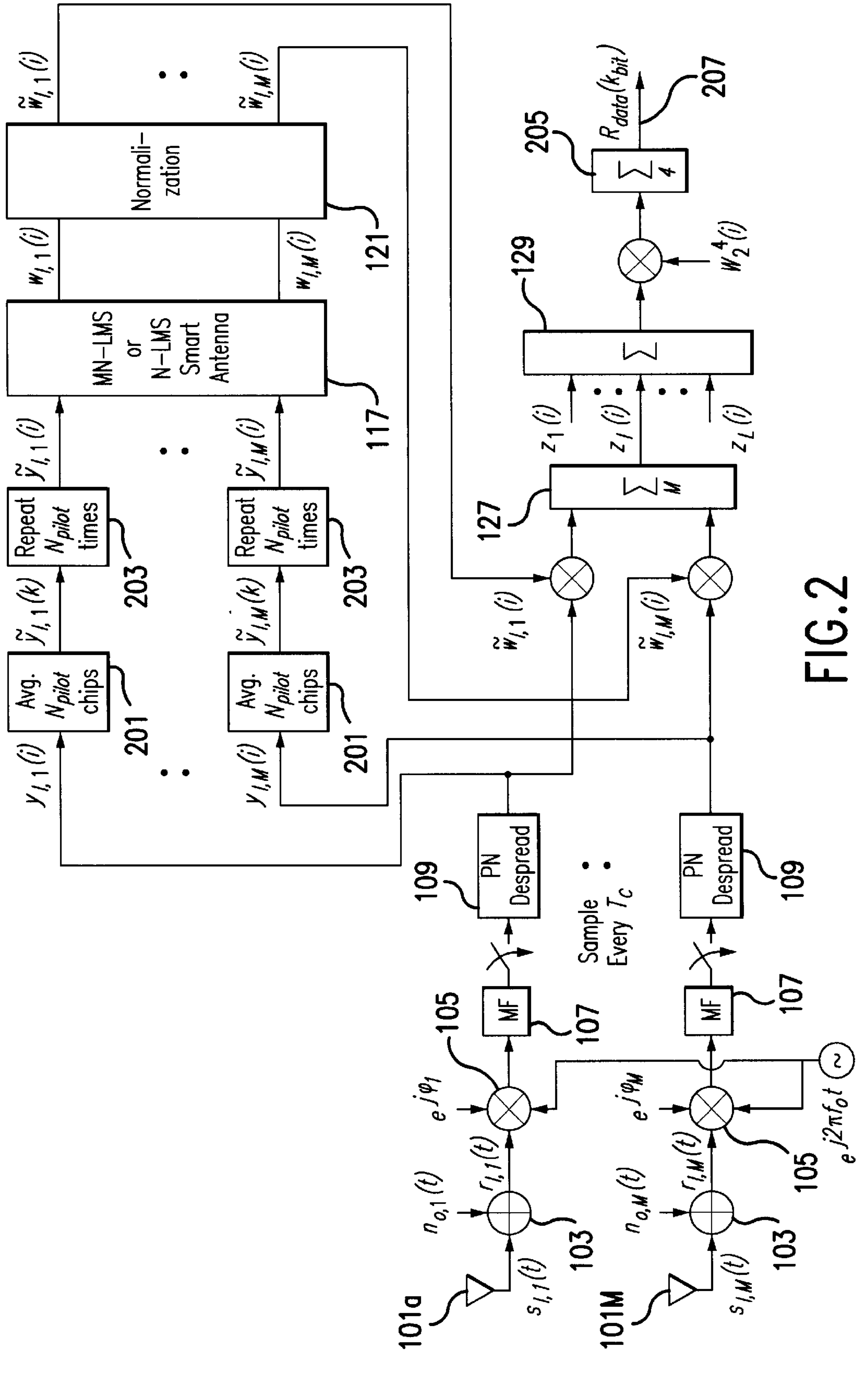
FIG. 2 shows a base station receiver block diagram with a smart antenna for a CDMA2000 reverse link in accordance with one embodiment of the present invention.

FIG. 2 shows a block diagram for a base station receiver for a CDMA2000 reverse link with either the MN-LMS in the present invention or a conventional N-LMS smart antenna algorithm. A linear antenna array of M elements is used, and the antenna array response vector $\underline{a}(\theta)$ is written as $\underline{a}(\theta)=[1e^{-j\pi \sin\theta} \ldots e^{-j(M-)\pi \sin\theta}]^T$ where θ is the DOA from the desired signal and the antenna spacing is a half wave length.

The received signal from antennas 101*a*–101M is frequency down-converted and thermal noise 103 is added in FIG. 2. The RF mixers 105 introduce different phase distortions, $\phi_1, \phi_2, \ldots, \phi_M$, as those in FIG. 1. The down converted signals are fed into the matched filters "MF" 107 in FIG. 2, and then sampled every chip $T_c$. The samples from M antenna elements are formed into a vector. The sampled M×1 vector at $iT_c$ is PN despread with a complex PN sequence $(a^I(i)+ja^Q(i))$ at "PN Despread" 109 in FIG. 2, and written as $$\underline{y}_l(i) = \begin{bmatrix} y_{l,1}(i) \\ \vdots \\ y_{l,M}(i) \end{bmatrix} = [A(i)+jB(i)] \tag{24}$$

$$\alpha_l(i)e^{j\phi_l(i)} \begin{bmatrix} e^{j\varphi_1} \\ e^{-j(\pi\sin\theta(i)-\varphi_2)} \\ \vdots \\ e^{-j((M-1)\pi\sin\theta(i)-\varphi_M)} \end{bmatrix} + \underline{\hat{n}}(i)$$

where

- i denotes the chip index,
- l denotes the finger (multipath) index, l=1, . . . , L,
- $\alpha n_l(i)$ is the amplitude of the l-th multipath,
- $\phi_l(i)$ is the phase of the l-th multipath, and
- $\hat{n}$ (i) represents the noise vector of AWGN plus interference due to other user signals.

The channel estimation including $a_l(i)$, $\phi_l(i)$, $\theta_l(i)$, and $\phi_m$ together in equation (24) can be obtained by accumulating $\underline{y}_l(i)$ over a multiple of Walsh symbols and using the Walsh orthogonal property at "Avg. $N_{pilot}$ chips" 201 in FIG. 2. The output vector $\tilde{y}_l(k)$ after Avg. $N_{pilot}$ chip accumulation can be written as $$\tilde{\underline{y}}_l(k) = \begin{bmatrix} \tilde{y}_{l,1}(k) \\ \vdots \\ \tilde{y}_{l,M}(k) \end{bmatrix} = \sum_{i=(k-1)N_{pilot}+1}^{kN_{pilot}} \underline{y}_l(i) \tag{25}$$

$$= N_{pilot}A(kN_{pilot})\alpha_l(kN_{pilot})e^{j\phi_l(kN_{pilot})}$$

-continued $$\begin{bmatrix} e^{j\varphi_1} \\ e^{-j(\pi\sin\theta(kN_{pilot})-\varphi_2)} \\ \vdots \\ e^{-j((M-1)\pi\sin\theta(kN_{pilot})-\varphi_M)} \end{bmatrix} + \underline{\tilde{n}}(kN_{pilot})$$

where k denotes a channel observation index with observation interval equal to $N_{pilot}T_c$, and Walsh modulated traffic channel data disappears after $N_{pilot}$ chip accumulation, i.e., $$\sum_{i=(k-1)N_{pilot}+1}^{kN_{pilot}} \{B(i) = W_2^4(i)d_t(i)\} = 0$$

due to the Walsh orthogonality every bit.

It is reasonable to choose $N_{pilot}$=256 chips from the results because the multipath amplitude, phase, and the DOA are almost constant during an observation interval. The output vector $\underline{\tilde{y}}_l(k)$ is repeated $N_{pilot}$ times to update the weight vector “Repeat $N_{pilot}$ times” 203 in FIG. 2 if the smart antenna snapshot rate is equal to the chip rate. The number of repetitions decreases as the snap shot rate decreases. The repeated sequence, which is the input to the smart antenna 117, is written as $$\underline{\tilde{y}}_l(i)\underline{\tilde{y}}_l(kN_{pilot}) \text{ for } (k-1)N_{pilot} \leqq i \leqq kN_{pilot}. \quad (26)$$

The input to the smart antenna 117 in FIG. 2 for the i-th chip interval is written as $$\underline{\tilde{y}}_l(i) = N_{pilot}A(i)\alpha_l(i)e^{j\phi_l(i)} \begin{bmatrix} e^{j\varphi_1} \\ e^{-j(\pi\sin\theta(i)-\varphi_2)} \\ \vdots \\ e^{-j((M-1)\pi\sin\theta(i)-\varphi_M)} \end{bmatrix} + \underline{\tilde{n}}(i) \quad (27)$$

for both the N-LMS in equation (13) and MN-LMS algorithm in equation (16).

The weight vector $\underline{w}_l(i)$ is obtained by using equation (13) and (16) with input $\underline{\tilde{y}}_l(i)$ in equation (27) for the N-LMS and MN-LMS algorithms, respectively. The weight vector is normalized at “Normalization” 121 in FIG. 2, and denoted as $\underline{\tilde{y}}_l(i)$. The smart antenna output is obtained by taking the inner-product between the normalized weight vector $\underline{\tilde{y}}_l(i)$ and the received signal vector $\underline{y}_l(i)$ (not $\underline{\tilde{y}}_l(i)$ ). The array output is denoted as $z_l(i)$ at $$\sum_M$$

127 in FIG. 2, and is written as $$z_l(i) = \underline{\tilde{w}}_l^H(i)\underline{y}_l(i) = \left[\frac{\underline{w}_l(i)}{\underline{w}_l^H(i)\underline{w}_l(i)/M}\right]^H \underline{y}_l(i) \approx MA(i)(A(i)+jB(i))\alpha_l^2(i) \quad (28)$$

for l=1, . . . , L. Then, the outputs from finger l, l=1, . . . , L, are combined for a Rake receiver to obtain the transmitted traffic data $d_{trafic}(k_{bit})$ at “Σ” 129 in FIG. 2. Walsh demodulation is performed by multiplying with $W_2^4(i)$ and accumulating over at $$\sum_4$$

205 in FIG. 2. The overall output 207 is written as $$R_{data}(k_{bit}) \approx cd_{trafic}(k_{bit}) \quad (29)$$

where c is a positive constant, $k_{bit}$ is the traffic channel bit index, and four chips per bit are used with $W_2^4(i)$ The soft decision variable $R_{data}(k_{bit})$ is used for a soft decision decoder. The hard decision value would be the sign of $R_{data}(k_{bit})$.

Again, the weight vector automatically compensates for phase distortion, and therefore no separate phase calibration is needed.

SIMULATION RESULTS

The simulation system parameters are listed in TABLES 1and 2 for a W-CDMA and a CDMA2000 system, respectively, in accordance with embodiments of the invention.

TABLE 1

System simulation parameters used for a W-CDMA system such as shown in FIG. 1.

| DESCRIPTION | NOTATION | VALUE |
|---|---|---|
| Data rate | $R_b$ | 960 kbps |
| Chip rate | $R_c$ | 3.84 Mcps |
| Carrier Frequency | $f_0$ | 1.95 GHz |
| Pilot data spreading gain | $SF_{DPDCH}$ | 256 |
| Pilot data Walsh symbol | $C_{ch,256.0}$ | All 1’s |
| Traffic data spreading gain | $SF_{DPCCH}$ | 4 |
| Traffic data Walsh symbol | $C_{ch,4.2}$ | 1, −1, 1, −1 |
| Convolutional code | | Not used |
| Mobile speed | v | 50 km/h |
| Multipath fading model | | Jakes Fading |
| Number of multipaths | L | 2 |
| Convergence parameter for smart antenna | $\mu$ | 1.5 |
| Positive constant for smart antenna in equations (13) and (16) | α | 0.1 |
| Initial DOA | $\theta_0$ | 0° |
| DOA increment of the desired signal | Δθ | 3.7e-05° per snapshot |
| Uniformly distributed random phase distortions due to mixers | $\phi_1, \ldots, \phi_M$ | Random (0, 2π) |

TABLE 2

Simulation system parameters used for a CDMA2000 system, such as shown in FIG. 2.

| DESCRIPTION | NOTATION | VALUE |
|---|---|---|
| Data rate | $R_b$ | 76.8 kbps |
| Chip Rate | $R_c$ | 1.2288 Mcps |
| Carrier frequency | $f_0$ | 1.95 GHz |
| Pilot data spreading gain | $SF_{pilot}$ | 32 |
| Pilot data Walsh symbol | $W_0^{32}$ | All 1’s |
| Traffic data spreading gain | $SF_{traffic}$ | 4 |
| Traffic data Walsh symbol | $W_2^4$ | 1, 1, −1, −1 |
| Convolutional Code | | Not used |
| Mobile speed | v | 50 km/h |
| Multipath fading model | | Jakes Fading |
| Number of multipaths | L | 2 |
| Convergence parameter for smart antenna | $\mu$ | 1.5 |
| Positive constant for smart antenna in equations (13) and (16) | α | 0.1 |
| Initial DOA | $\theta_0$ | 0° |

TABLE 2-continued

Simulation system parameters used for a CDMA2000 system, such as shown in FIG. 2.

| DESCRIPTION | NOTATION | VALUE |
|---|---|---|
| DOA increment of the desired signal | $\Delta\theta$ | 3.7e-05° per snapshot |
| Uniformly distributed random phase distortions due to the mixers | $\phi_1, \ldots, \phi_M$ | Random (0, 2π) |

The Jakes Fading of Tables 1 and 2 is discussed, for example, in W. C. Jr., Jakes, Microwave Mobile Communications, Wiley-Interscience, 1974, pp. 65–78.

Figure 3A:
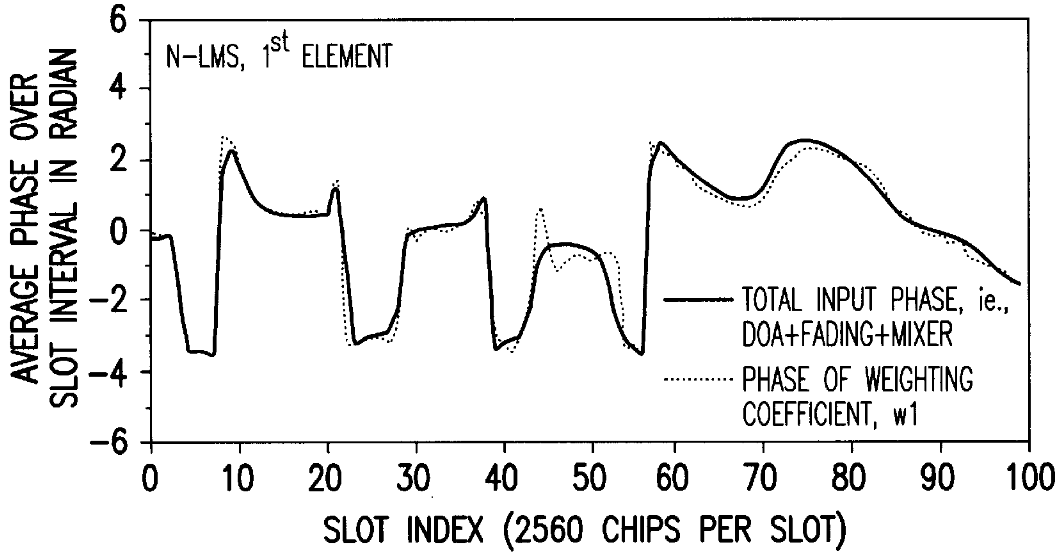
FIGS. 3A–3C show angle tracking capability of a smart antenna with the N-LMS for W-CDMA in accordance with one embodiment of the present invention.
Figure 3B:
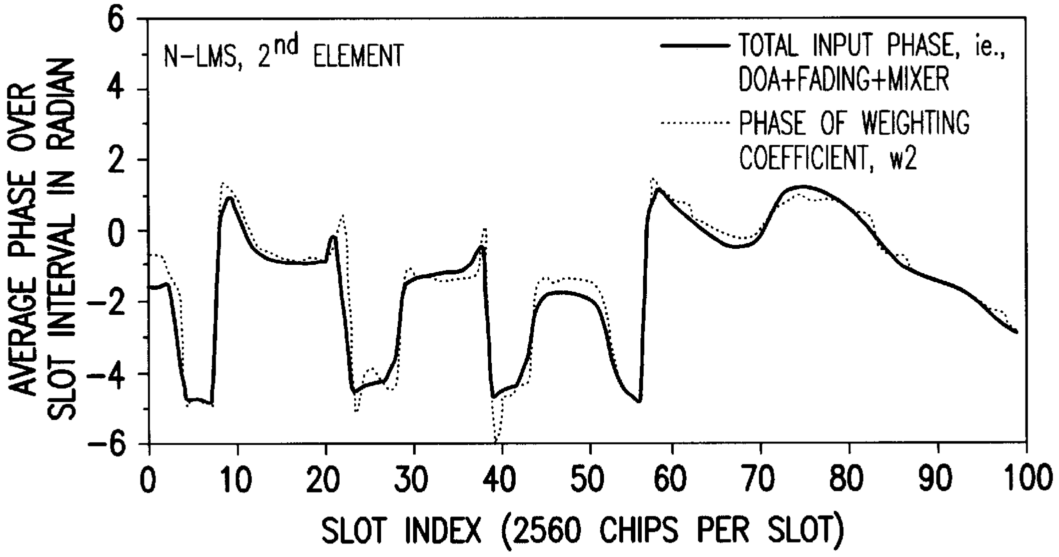
Figure 3C:
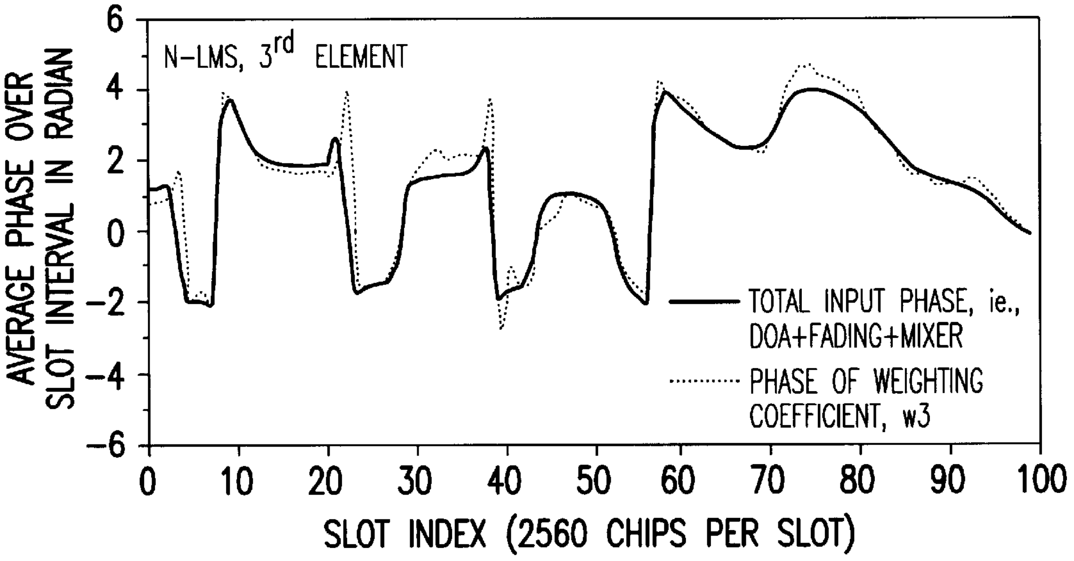

FIG. 3 is a simulation showing a tracking capability at each element of M=3 elements when a smart antenna with the conventional N-LMS algorithm is used for a W-CDMA system such as in FIG. 1. FIG. 3A, 3B, and 3C illustrate the Average Phase Over Slot Interval in Radian, for $1^{st}$, $2^{nd}$ and $3^{rd}$ antenna element, respectively.

Figure 4A:
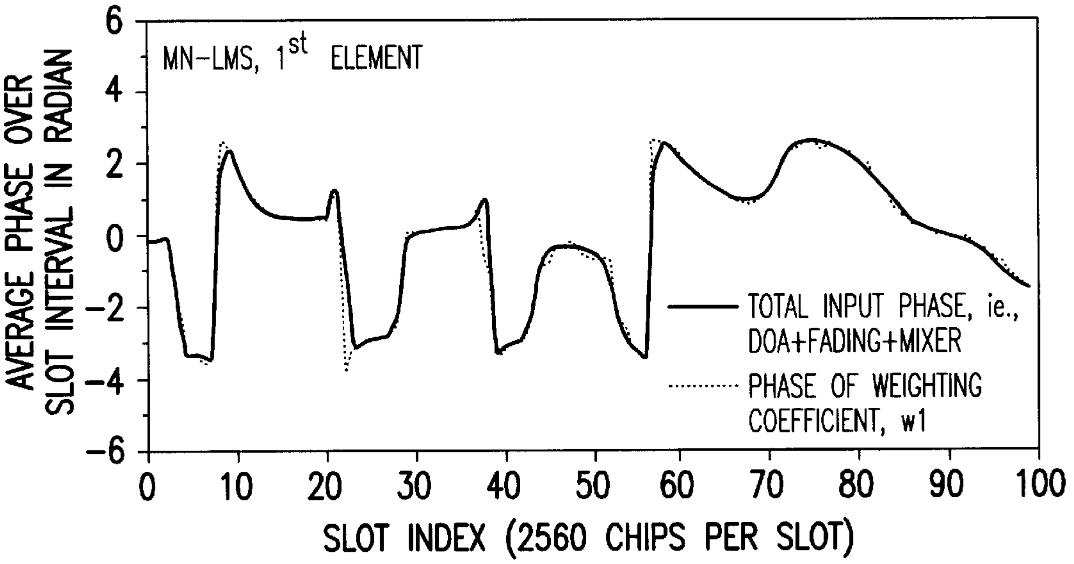
FIGS. 4A–4C show angle tracking capability of a smart antenna with the MN-LMS for W-CDMA in accordance with one embodiment of the present invention.
Figure 4B:
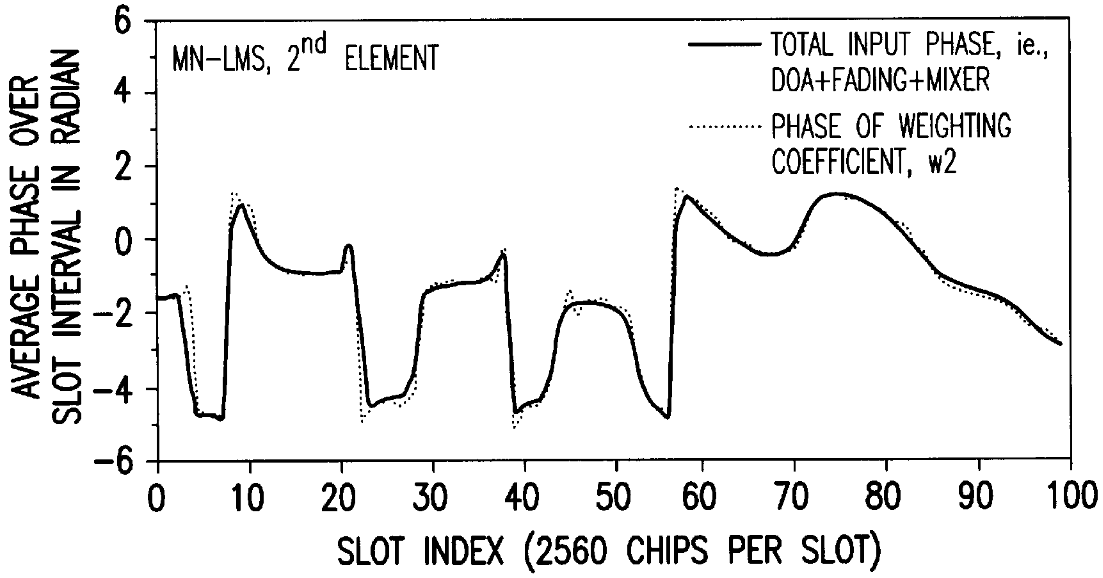
Figure 4C:
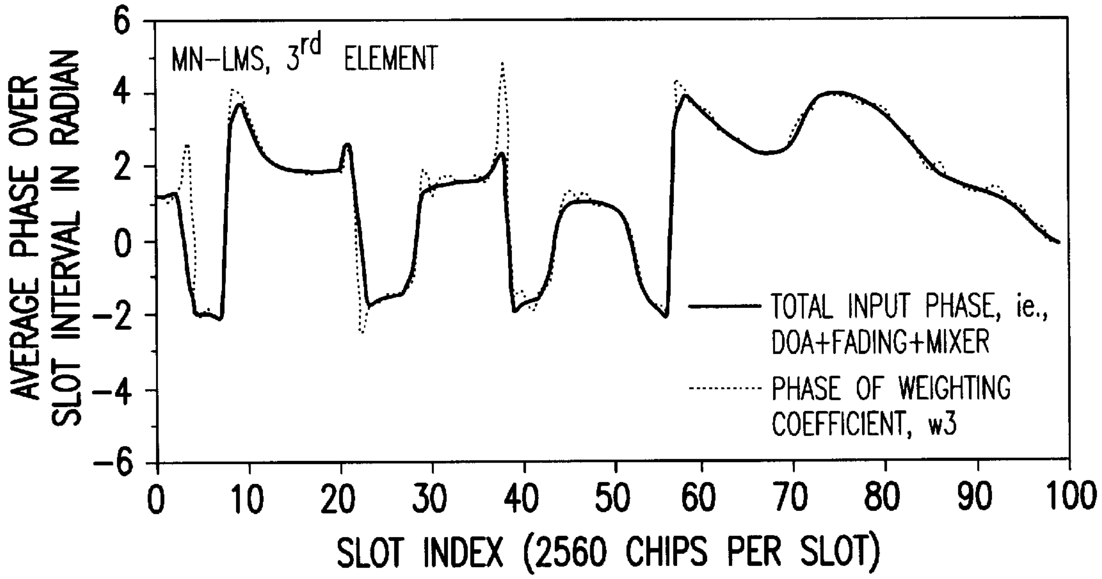

FIG. 4 is a simulation showing the corresponding tracking capability of the MN-LMS smart antenna algorithm with the MN-LMS algorithm. FIG. 4A, 4B and 4C illustrate the Average Phase over Slot Interval in Radian, for $1^{st}$, $2^{nd}$ and $3^{rd}$ antenna element, respectively. FIG. 4 informs that the phase of the each element in the weight vector converges to the individual input total phase, which is the sum of the DOA, fading phase, and the phase distortion due to the mixers. The output phase by using MN-LMS algorithm in the present invention is close to the total input phase as shown in FIG. 4. The tracking capability of the conventional N-LMS algorithm in FIG. 3 shows a little bit worse performance than that of the MN-LMS in FIG. 4.

Figure 5:
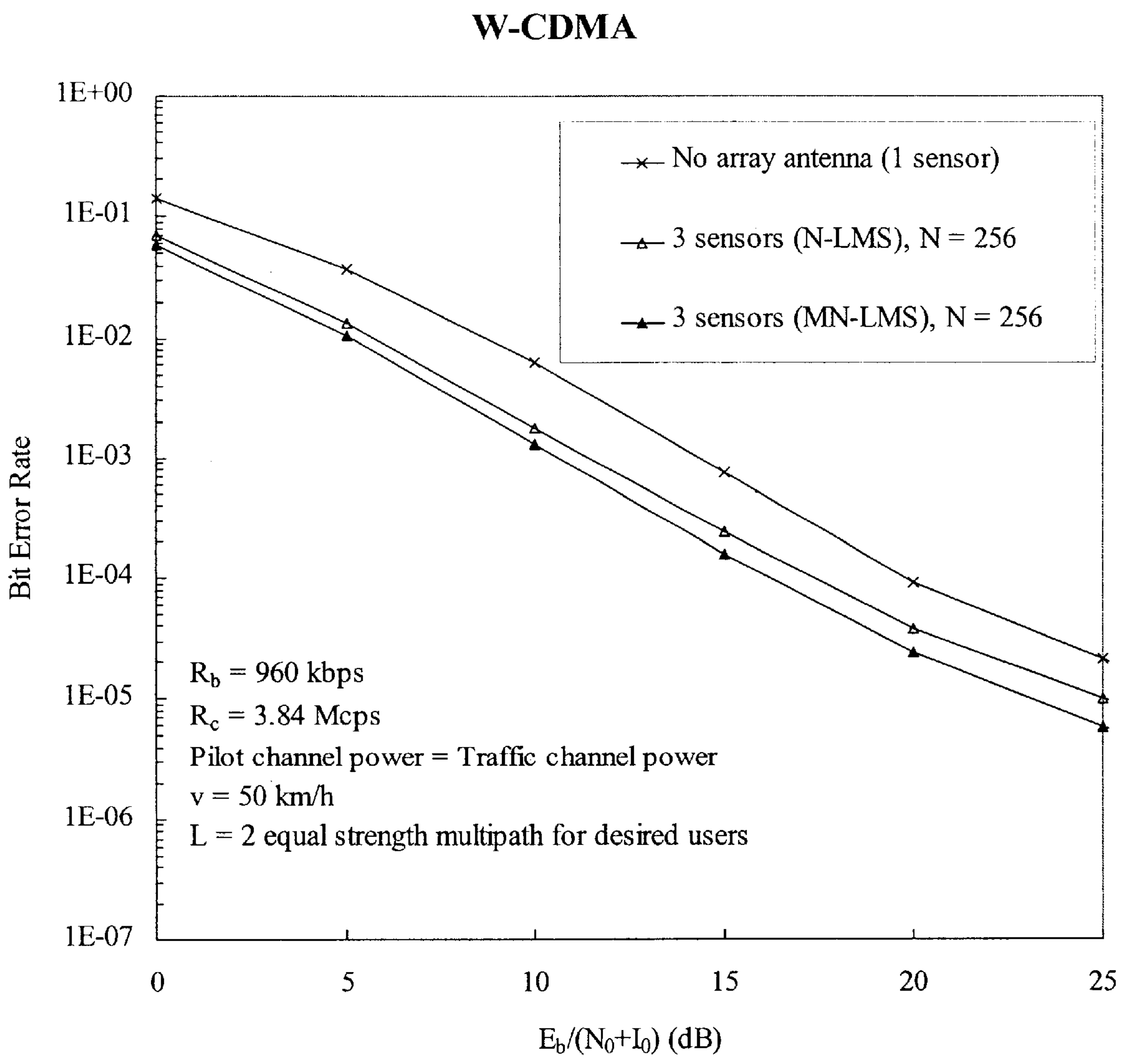
FIG. 5 shows simulation BER results for a W-CDMA system with smart antennas by using the MN-LMS and N-LMS algorithms, where M is the number of array antenna elements, in accordance with one embodiment of the present invention.

FIG. 5 shows simulation bit error rate (BER) results of the MN-LMS algorithm with the number of antenna element M as a parameter, e.g., M=1 and 3 for a W-CDMA reverse link. BER results for the N-LMS algorithm are also shown for comparison. FIG. 5 also shows that the smart antenna of the MN-LMS algorithm in the present invention is 1 dB better in bit-energy-to-noise plus interference ratio $E_b/(N_0o+I_0)$ than the conventional N-LMS algorithm at BER=$10^{-3}$ when M=3. In addition, FIG. 5 shows that significant BER improvement, e.g., about 5 dB improvement in $E_b/(N_0+I_0)$, can be achieved by employing the smart antenna when M=3 elements, compared to a single antenna.

Figure 6:
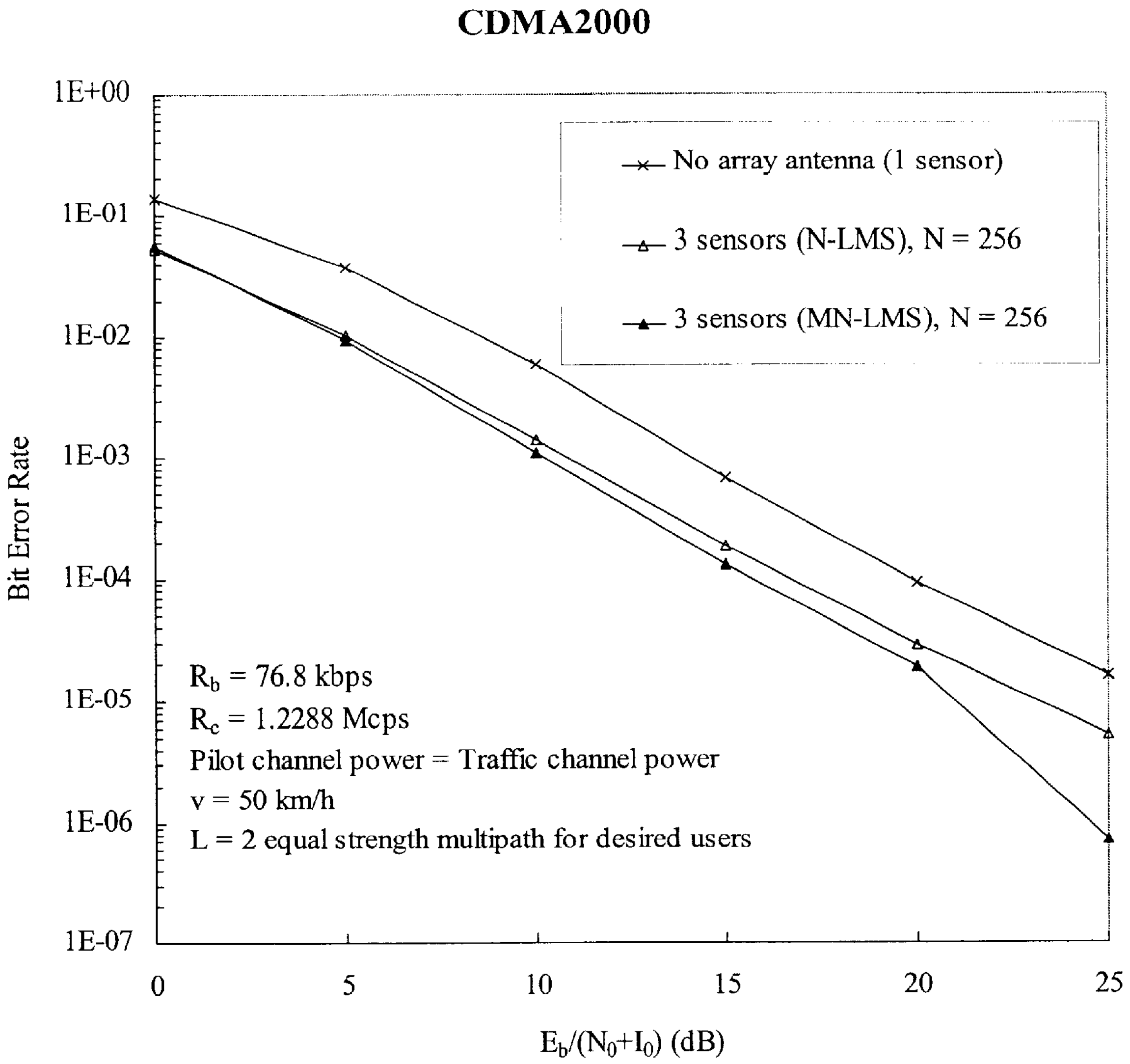
FIG. 6 shows simulation BER results for a CDMA2000 system with smart antennas by using the MN-LMS and N-LMS algorithms, where M is the number of array antenna elements, in accordance with one embodiment of the present invention.

FIG. 6 shows the corresponding simulation BER results for a CDMA2000 reverse link. Similar observations are also observed in FIG. 6. The simulated BER results at $E_b/(N_{0+}I_0)$=25 dB may be inadequate due to insufficient simulation runs. It is anticipated that actual results will result in a smooth curve.

In conclusion, the smart antenna with the MN-LMS algorithm in the present invention does not require any phase calibration for the different RF mixers phase distortions. In addition, separate channel estimation is not used for demodulation in the present invention. Furthermore, the smart antenna with the MN-LMS in the present invention yields better BER results than a smart antenna with a conventional N-LMS algorithm. Finally, the smart antenna with the N-LMS or MN-LMS algorithm at MN-LMS smart antenna requires a linear order of M complex multiplications, e.g., (5M+2) complex multiplication, and a linear order of complex additions, e.g., (4M+1) complex additions per snapshot, which can be implemented with a modern chip technology. This is a significant difference over conventional smart antenna technology which may require more than $M^2$ order of computations.

While the preferred mode and best mode for carrying out the invention have been described, those familiar with the art to which this invention relates will appreciate that various alternative designs and embodiments for practicing the invention are possible, and will fall within the scope of the following claims.

What is claimed is:

1. A method of receiving a signal for use in combination with wireless communications, comprising the steps of:

(A) receiving a signal in a plurality of antennas; and (B) processing the received signal utilizing an updated weight vector, wherein the updated weight vector compensates substantially for a phase distortion of the signal, wherein the received signal is processed according to:

$$\underline{w}_l(i+1) = \underline{w}_l(i) + \frac{\mu}{a + \|\underline{\tilde{y}}_l(i)\|^2} \times \left[M\underline{\tilde{y}}_l(i) - \underline{\tilde{y}}_l^H(i)\underline{\tilde{y}}_l(i)\underline{w}_l(i)\right]$$
$$= \underline{w}_l(i) + \frac{\mu}{a + \|\underline{\tilde{y}}_l(i)\|^2} \times \left[M\underline{\tilde{y}}_l(i) - \|\underline{\tilde{y}}_l(i)\|^2\underline{w}_l(i)\right].$$

2. The method of claim 1, wherein the plurality of antennas is a multiple antenna array.

3. The method of claim 1, wherein the plurality of antennas is multiple antennas.

4. The method of claim 1, the method not including a step of phase calibration.

5. The method of claim 1, wherein the plurality of antennas are in a base station.

6. The method of claim 1, wherein the plurality of antennas are in a mobile station.

7. A method of receiving a signal for use in combination with wireless communications, comprising the steps of:

(A) receiving a signal in a plurality of antennas; and (B) processing the received signal utilizing an updated weight vector, wherein the updated weight vector compensates substantially for a phase distortion of the signal, wherein the received signal is processed according to $$\underline{w}_l(i+1) = \underline{w}_l(i) + \frac{\mu}{a + \|\underline{\tilde{y}}_l(i)\|^2} \times \left[M\underline{\tilde{y}}_l(i) - \underline{\tilde{y}}_l(i)\underline{\tilde{y}}_l^H(i)\underline{w}_l(i)\right].$$

8. The method of claim 7, wherein the plurality of antennas is a multiple antenna array.

9. The method of claim 7, wherein the plurality of antennas is multiple antennas.

10. The method of claim 7, the method not including a step of phase calibration.

11. The method of claim 7, wherein the plurality of antennas are in a base station.

12. The method of claim 7, wherein the plurality of antennas are in a mobile station.

13. A system for receiving a signal for use in combination with wireless communications, comprising:

(A) at least one signal processor, responsive to a signal received in a plurality of antennas, for processing the received signal utilizing an updated weight vector, wherein the updated weight vector compensates substantially for a phase distortion of the signal; and (B) wherein the received signal is processed according to:

$$\underline{w}_l(i+1) = \underline{w}_l(i) + \frac{\mu}{a + \|\tilde{\underline{y}}_l(i)\|^2} \times \left[M\tilde{\underline{y}}_l(i) - \tilde{\underline{y}}_l^H(i)\tilde{\underline{y}}_l(i)\underline{w}_l(i)\right]$$

$$= \underline{w}_l(i) + \frac{\mu}{a + \|\tilde{\underline{y}}_l(i)\|^2} \times \left[M\tilde{\underline{y}}_l(i) - \|\tilde{\underline{y}}_l(i)\|^2 \underline{w}_l(i)\right].$$

14. The system of claim 13, wherein the plurality of antennas is multiple antennas.

15. The system of claim 13, the method not including a step of phase calibration.

16. The system of claim 13, further comprising a base station, wherein the plurality of antennas are in the base station.

17. The system of claim 13, further comprising a mobile station, wherein the plurality of antennas are in the mobile station.

18. A system for receiving a signal for use in combination with wireless communications, comprising:

(A) at least one signal processor, responsive to a signal received in a plurality of antennas, for processing the received signal utilizing an updated weight vector, wherein the updated weight vector compensates substantially for a phase distortion of the signal; and (B) wherein the received signal is processed according to:

$$\underline{w}_l(i+1) = \underline{w}_l(i) + \frac{\mu}{a + \|\tilde{\underline{y}}_l(i)\|^2} \times \left[M\tilde{\underline{y}}_l(i) - \tilde{\underline{y}}_l(i)\tilde{\underline{y}}_l^H(i)\underline{w}_l(i)\right].$$

19. The system of claim 18, wherein the plurality of antennas is multiple antennas.

20. The system of claim 18, the method not including a step of phase calibration.

21. The system of claim 18, further comprising a base station, wherein the plurality of antennas are in the base station.

22. The system of claim 18, further comprising a mobile station, wherein the plurality of antennas are in the mobile station.

* * * * *